(12) United States Patent
Kim et al.

(10) Patent No.: US 10,349,343 B2
(45) Date of Patent: Jul. 9, 2019

(54) METHOD FOR PERFORMING SCANNING IN WIRELESS LAN SYSTEM, AND DEVICE THEREFOR

(71) Applicant: LG ELECTRONICS INC., Seoul (KR)

(72) Inventors: Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/759,083

(22) PCT Filed: Sep. 21, 2016

(86) PCT No.: PCT/KR2016/010509
§ 371 (c)(1),
(2) Date: Mar. 9, 2018

(87) PCT Pub. No.: WO2017/052176
PCT Pub. Date: Mar. 30, 2017

(65) Prior Publication Data
US 2019/0053134 A1 Feb. 14, 2019

Related U.S. Application Data

(60) Provisional application No. 62/222,220, filed on Sep. 23, 2015, provisional application No. 62/222,796, filed on Sep. 24, 2015.

(51) Int. Cl.
*H04W 48/16* (2009.01)
*H04W 48/14* (2009.01)
(Continued)

(52) U.S. Cl.
CPC ......... *H04W 48/16* (2013.01); *H04L 25/0204* (2013.01); *H04W 48/14* (2013.01); *H04W 74/0891* (2013.01); *H04W 84/12* (2013.01)

(58) Field of Classification Search
CPC . H04W 48/16; H04W 48/14; H04W 74/0891; H04W 84/12; H04L 25/0204
See application file for complete search history.

(56) References Cited

U.S. PATENT DOCUMENTS

2013/0176897 A1* 7/2013 Wang ............... H04W 12/06
370/254
2013/0176925 A1 7/2013 Sampath et al.

FOREIGN PATENT DOCUMENTS

WO 2013169072 11/2013
WO 2014030894 2/2014
(Continued)

OTHER PUBLICATIONS

PCT International Application No. PCT/KR2016/010509, Written Opinion of the International Searching Authority dated Dec. 19, 2016, 18 pages.

*Primary Examiner* — Duc C Ho
(74) *Attorney, Agent, or Firm* — Lee, Hong, Degerman, Kang & Waimey PC

(57) ABSTRACT

A method by which a station (STA) performs active scanning in a wireless LAN system, according to one embodiment of the present invention, comprises the steps of: setting, by the STA, a timer for maintaining a basic service set (BSS) configuration parameter set which has been acquired from an access point (AP) in the past; and when the AP is to be accessed before the time expires, transmitting to the AP, a probe request frame including an AP configuration sequence number (AP-CSN) indicating a version of the BSS configuration parameter set, wherein the STA sets the value of the timer for maintaining the BSS configuration parameter set on the basis of the length of the AP-CSN.

14 Claims, 10 Drawing Sheets

(51) Int. Cl.
*H04W 84/12* (2009.01)
*H04L 25/02* (2006.01)
*H04W 74/08* (2009.01)

(56) References Cited

FOREIGN PATENT DOCUMENTS

WO 2014088175 6/2014
WO 2014137172 9/2014

\* cited by examiner

METHOD FOR PERFORMING SCANNING IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2016/010509, filed on Sep. 21, 2016, which claims the benefit of U.S. Provisional Application No. 62/222,220, filed on Sep. 23, 2015 and 62/222,796, filed on Sep. 24, 2015 the contents of which are all hereby incorporated by reference herein in their entirety.

TECHNICAL FIELD

The present invention relates to a method and apparatus for performing scanning in a wireless LAN system, and more particularly, to a method of performing active scanning based on a previously obtained BSS configuration parameter and apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE OF THE INVENTION

Technical Task

The technical task of the present invention is to provide a method for an STA to perform active scanning for a preferred AP accurately and efficiently in a wireless LAN system and apparatus for performing the same.

The present invention is not limited to the above technical problems and other technical objects may be inferred from embodiments of the present invention.

Technical Solutions

In one technical aspect of the present invention, provided herein is a method of performing active scanning by a station (STA) in a wireless LAN system, including setting a timer for retaining a BSS (basic service set) configuration parameter set which has been obtained in advance by the STA from an access point (AP) and transmitting, to the AP, a probe request frame including an AP configuration sequence number (AP-CSN) indicating a version of the BSS configuration parameter set, when the STA is attempting to access the AP before the timer expires, wherein the STA sets a value of the timer for retaining the BSS configuration parameter set based on a length of the AP-CSN.

In another technical aspect of the present invention, provided herein is a station (STA) performing active scanning in a wireless LAN system, including a transmitter to transmit a probe request frame to an access point (AP) and a processor to set a timer for retaining a BSS (basic service set) configuration parameter set obtained in the past by the STA from an access point (AP) and to set an AP configuration sequence number (AP-CSN) indicating a version of the BSS configuration parameter set to the probe request frame when the STA is attempting to access the AP before the timer expires, wherein the processor is further configured to set a value of the timer for retaining the BSS configuration parameter set based on a length of the AP-CSN.

The value of the timer exponentially increases or decreases with respect to the length of the AP-CSN.

The value of the timer is set to $M*2^N$, where 'M' denotes a minimum time for retaining the AP-CSN, and 'N' denotes the length of the AP-CSN. The STA may receive a frame indicating the minimum time 'M' for retaining the AP-CSN from the AP.

The probe request frame may further include on an AP's restart count known to the STA.

The STA may receive a probe response frame from the AP. Contents of the probe response fame may be determined according to whether the AP's restart count included in the probe request frame and the AP-CSN matches up with an actual restart count of the AP and a current AP-CSN of the AP, respectively.

When the AP's restart count included in the probe request fame matches up with the actual restart count of the AP and the AP-CSN matches up with the current AP-CSN of the AP, the probe response frame may include a portion of system information only. When the AP's restart count included in the probe request fame matches up with the actual restart count of the AP, but the AP-CSN does not match up with the current AP-CSN of the AP, the probe response frame may further include information the STA should update in addition to the portion of the system information. When the AP's restart count included in the probe request fame does not match up with the actual restart count of the AP, the probe response frame may include all of the system information.

Advantageous Effects

According to one embodiment of the present invention, an access to a preferred AP can be quickly performed using a acquired BSS configuration parameter set previously acquired by an STA in a wireless LAN system, and AP-CSY synchronization error due to a long-term non-access, a restart of an AP and the like can be minimized by improving reliability of AP-CSN indicating a version of the BSS configuration parameter.

Other technical effects in addition to the above-described effects may be inferred from embodiments of the present invention

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
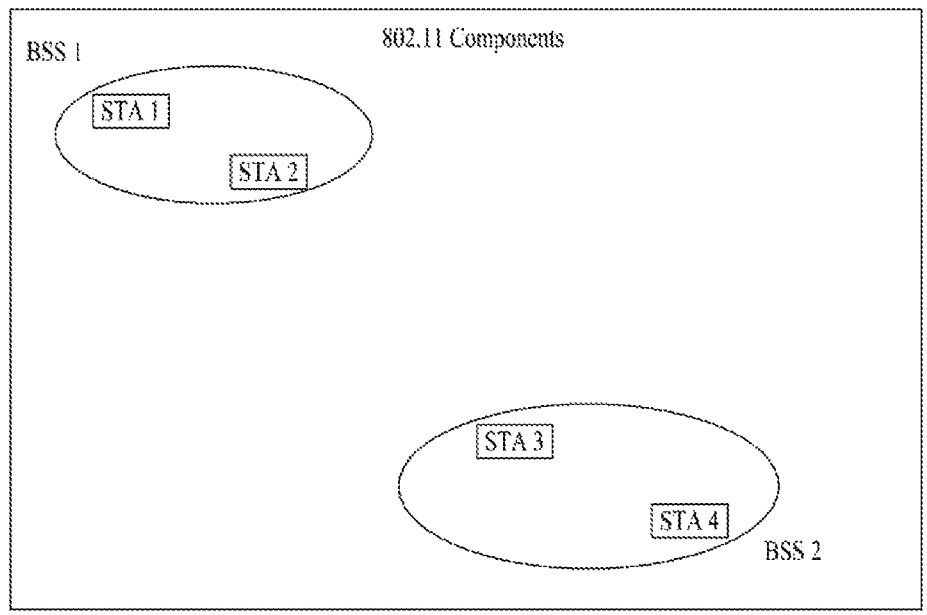
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
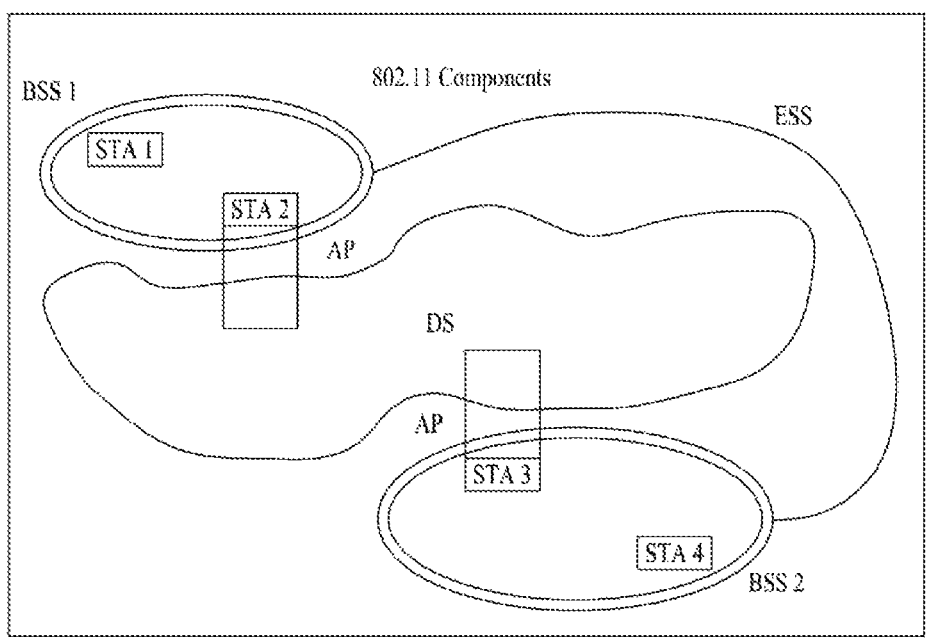
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
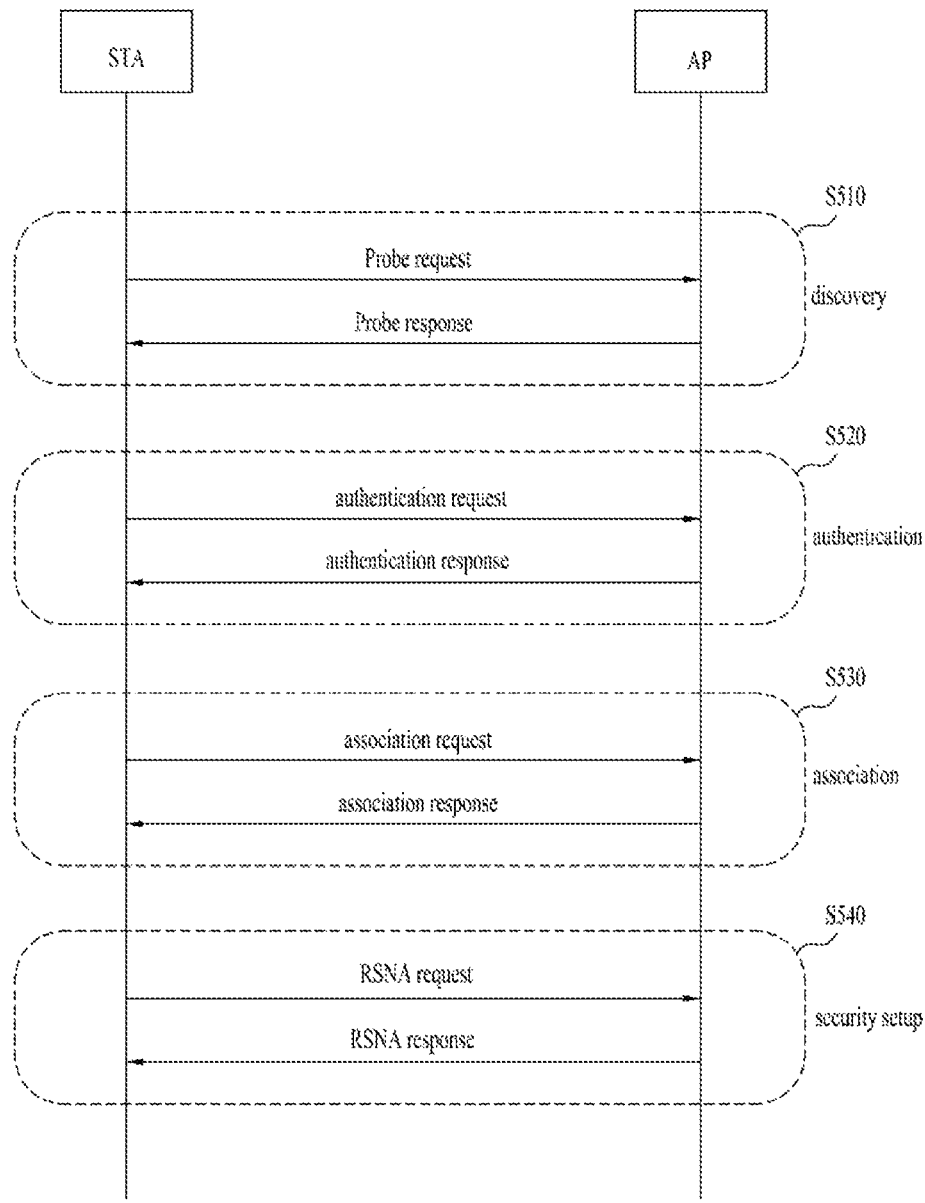
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
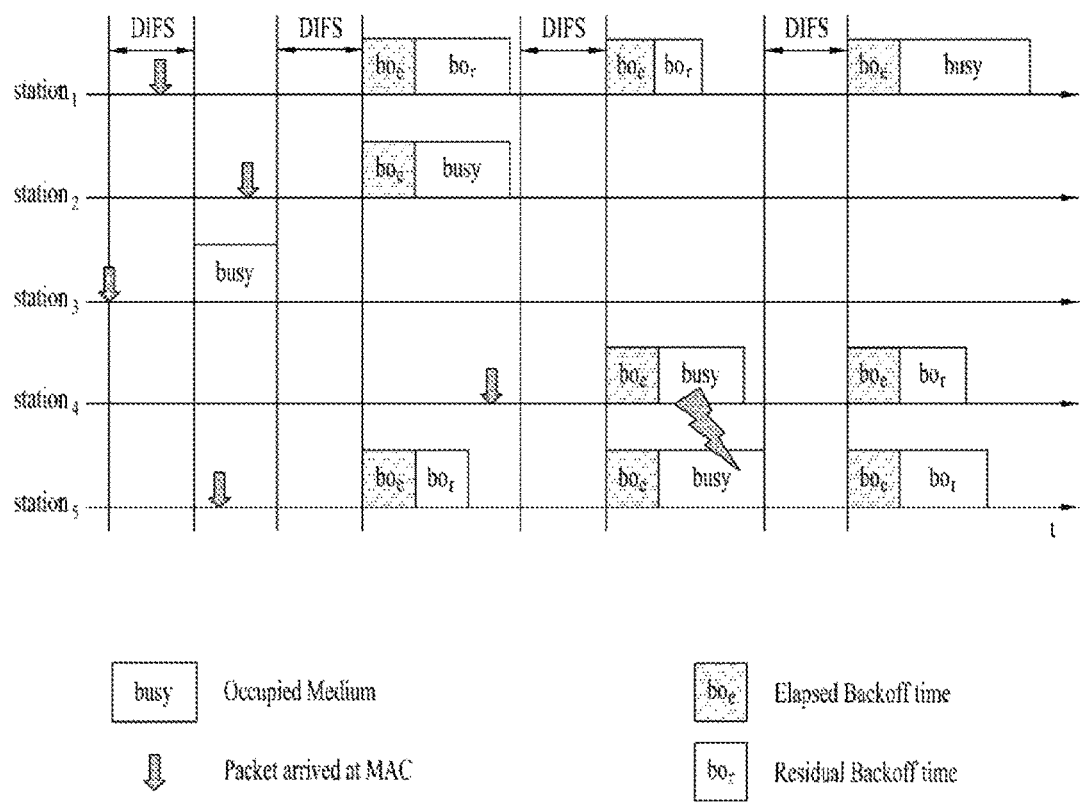
FIG. 4 illustrates a backoff procedure.

FIG. 4 is a conceptual diagram illustrating a backoff process.

Operations based on a random backoff period will hereinafter be described with reference to FIG. 4. If the occupy-or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
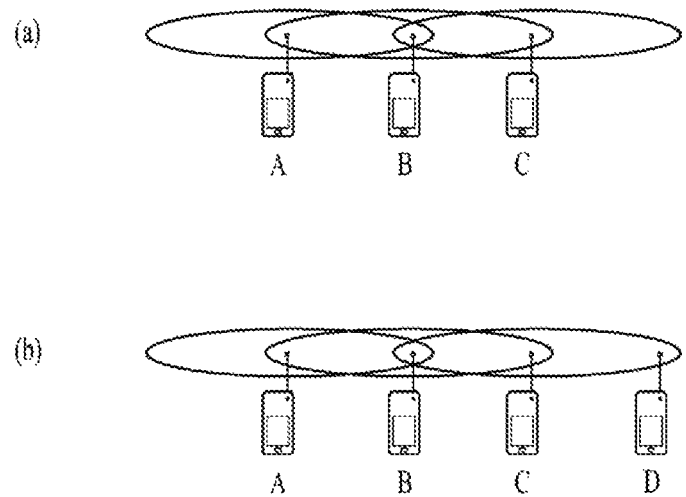
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
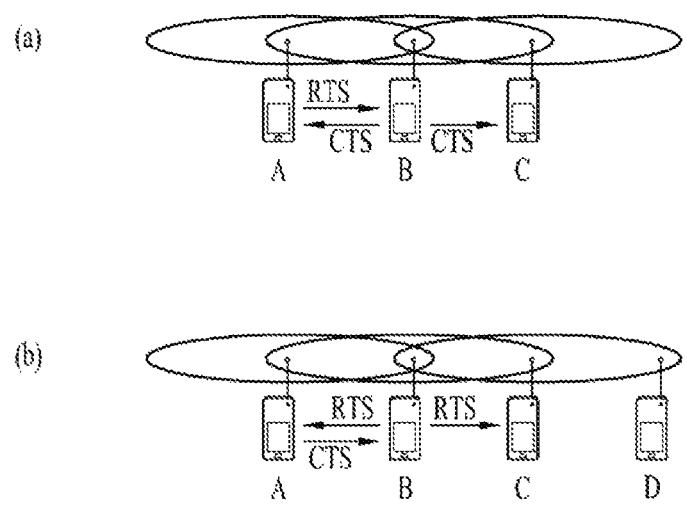
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unitcast frame and a delivery traffic indication map (DTIM) used to indicate a multicast or broadcast frame.

Figure 7:
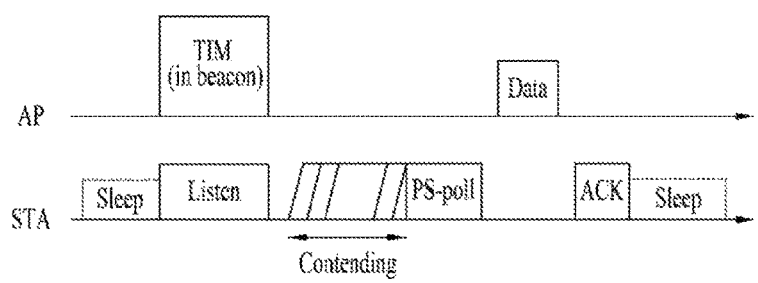
FIGS. 7 to 9 are explanatory diagrams of operation of an STA that has received TIM.
Figure 8:
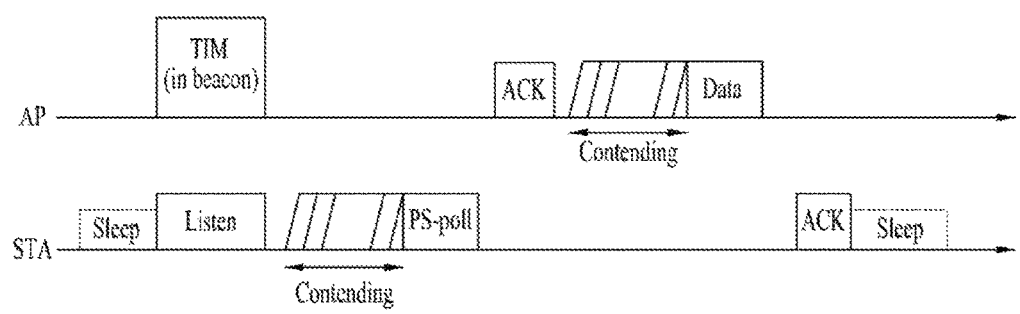
Figure 9:
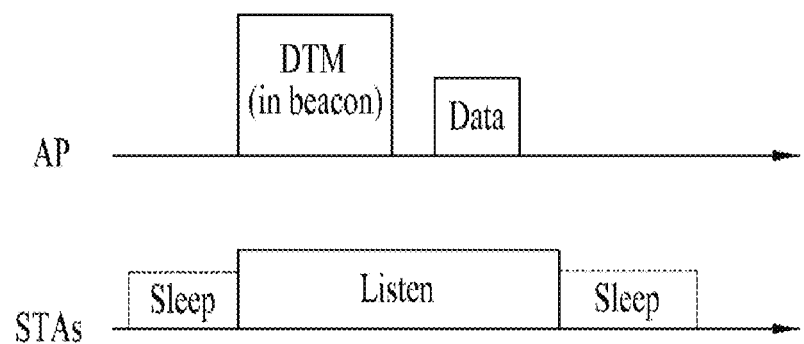

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
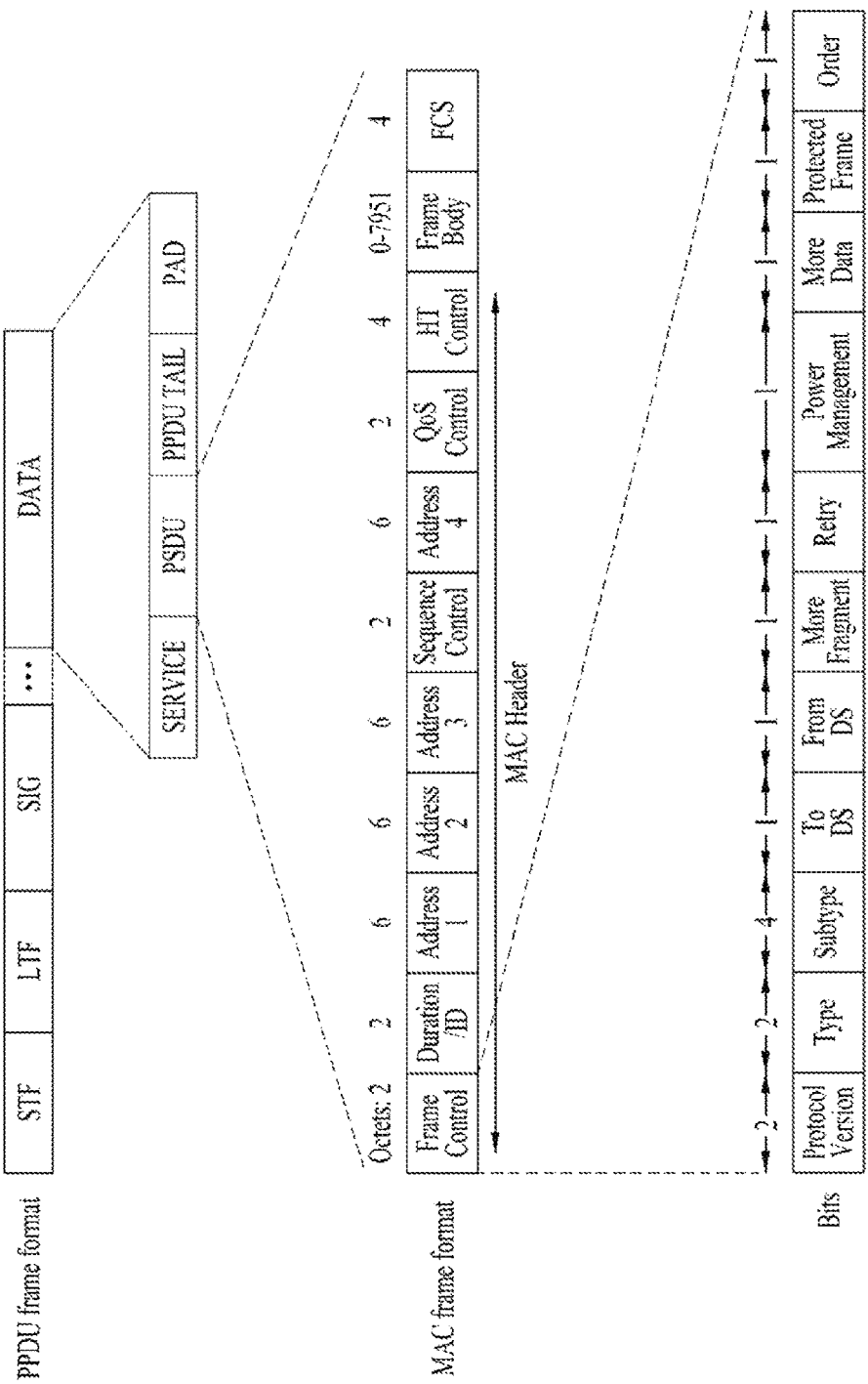
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Active Scanning of FILS STA

An STA (or AP) supportive of a FILS (fast link setup) operation provided in IEEE 802.11ai shall be referred to as a FILS STA (or FILS AP). In the following, a process for FILS STA to perform active scanning on a preferred AP is described.

A FILS non-AP STA can retain at least one BSS configuration parameter set. The BSS configuration parameter set can be obtained from a preferred AP. Each BSS configuration parameter set obtained from the preferred AP may vary depending on capability of the preferred AP. The BSS configuration parameter set is a set of elements of a beacon frame or a probe response frame. From the BSS configuration parameter set, dynamic information elements can be excluded. Table 1 exemplarily shows dynamic information elements excluded from a BSS configuration parameter set.

TABLE 1

TIM element
Quiet element
BSS Load element
EDCA Parameter element
BSS Average Access Delay element
BSS Available Admission Capacity element
BSS AC Access Delay element
Time Advertisement element
Emergency Alert Identifier element
Beacon Timing element
QLoad Report element
Extended BSS Load element
Quiet Channel element
Reduced Neighbor Report element
CAG Number element
AP-CSN element
Differentiated Initial Link Setup element
Fragment element
Vendor Specific element Although a vendor specific sub element is included in elements of a BSS configuration parameter set, an AP-CSN (configuration sequence number) does not provide information indicating whether the corresponding was changed. Moreover, if the vendor specific sub element is changed only, the AP-CSN is not increased.

A FILS AP retains an AP-CSN list including a current AP-CSN value and zero or more past AP-CSN values. The AP retains identifiers of the changed elements together for each of the past AP-CSN values. The AP retains an AP-CSN value for a predetermined period of time in the AP-CSN list.

If an element or field of the BSS configuration parameter set is updated, the AP retaining the AP-CSN list increases the current AP-CSN value by 1 based on the modulo 256 operation. The FILS AP provides the AP-CSN value by sending a beacon frame or a probe response frame including an AP-CSN element to FIGS STAs.

A FILS non-AP STA identifies a BSS configuration parameter set based on a relevant AP-CSN value and a BSSID of an AP.

If the BSS configuration parameter set has a BSS configuration parameter set related to an AP-CSN of a corresponding AP, an STA can send a probe request frame including an AP-CSN element. In case of sensing the probe request frame including the AP-CSN element, the BSS configuration parameter set sets a field of each of Address 1 and Address 3 fields of the probe request frame to BSSID of the AP.

After the FILS AP has received the probe request frame including the BSSID, when the corresponding probe request frame includes the AP-S\CSN element and the criteria for responding to the probe request frame are met: (i) if the AP does not retain the AP-CSN list, the AP sends a probe response frame; or (ii) if the AP retains the AP-CSN list, the AP compares APCSNs stored in the AP-CSN list with the received AP-CSN.

The AP sends the probe response frame in a following manner according to the comparison result. a) If an AP-CSN value that matches a current AP-CSN value is received, the AP sends an optimized probe response frame including mandatory fields, which include a timestamp field, a capability field and a beacon interval field, a current AP-CSN element and a dynamic element. b) If an AP-CSN value matching a past AP-CSN value of the AP-CSN list of the PA is received, the AP sends an optimized probe response frame including mandatory fields, which include a timestamp field, a capability field and a beacon interval field, a current AP-CSN element, an information element for an update by an STA side and a dynamic element. c) If an AP-CSN value failing to match any AP-CSN value of the AP-CSN list of the AP, the AP sends a probe response frame including a current AP-CSN and fields of a general probe response frame.

Figure 11:
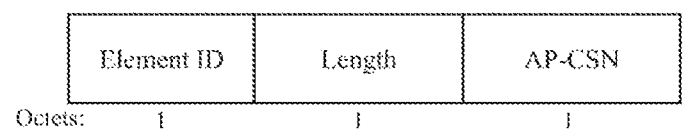
FIG. 11 shows an AP-CSN element.

FIG. 11 shows an AP-CSN element.

As described above, an AP-CSN element can indicate that system information in a BSS is changed. Referring to FIG. 11, each of an element ID field, a length field and an AP-CSN field is set to 1 octet.

As an AP-CSN field unsigned integer, it is initialized with a random integer value in a range of 0 to 255 during MLMESTART. An AP-CSN includes a version number of a BSS configuration parameter set. If a non-dynamic information element in a beacon frame is updated, the version number of the BSS configuration parameter set increases.

As described above, if accessing an AP, an STA stores BSS configuration parameters of the AP received through a beacon frame or a probe response frame. For a preferred AP, a UE (user equipment) can retain the BSS configuration parameters, which are stored for the corresponding AP, even after de-association. Version information for a BSS configuration parameter set can be identified through an AP-CSN value of the corresponding AP. Thereafter, if the STA accesses the preferred AP, the STA sends a probe request frame containing an AP-CSN. If receiving the probe request frame containing the AP-CSN, the AP sends a probe response frame to the STA in a manner that information elements required for the STA are contained in the probe response frame on the basis of the received AP-CSN value.

Meanwhile, while the STA stores the BSS configuration parameter set of the preferred AP, it may happen that the STA sends a probe request frame having an AP-CSN contained therein in case of accessing the preferred AP after a long time. For example, even after considerably long time has passed after de-association from the preferred AP, the STA can send a probe request frame in which an AP-CSN value of the then de-association is contained.

If the AP-CSN value contained in the probe request frame is equal to a current AP-CSN of the AP, the AP sends a probe response frame in a manner that minimum information (e.g., mandatory fields, AP-CSN, dynamic information elements) is contained in the probe response frame. Namely, since the AP assumes that the STA stores valid non-dynamic information elements and non-mandatory fields, the valid non-dynamic information elements and the non-mandatory fields can be omitted from the probe response frame.

Yet, if a value of AP-CSN of an AP is continuously changed and then applied, it may cause a problem that an STA fails to receive changed information elements (e.g., non-dynamic information elements and non-mandatory fields) through a probe response frame but has past information elements only. For example, an AP-CSN value is assumed as increasing by 1 each based on modulo 256 and a count of changes of CSN of an AP is assumed as 256. In this case, since a current AP-CSN value of the AP matches an AP-CSN value stored in the STA, it causes a problem that the AP does not provide information on changed information elements to the STA.

Methods for solving such problems are proposed as follows.

Proposal 1

According to one embodiment of the present invention, it is able to increase a size of an AP-CSN field. For example, a size of AP-CSN can be set to a value greater than 1 byte. Particularly, the size of AP-CSN can be set to one of 2, 4, 8 and 16 bytes.

Figure 12:
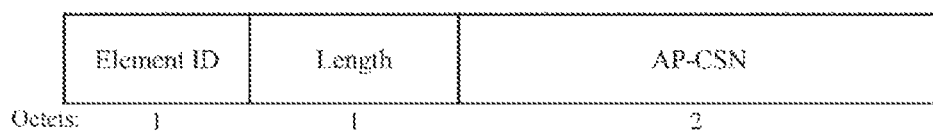
FIG. 12 shows an extended AP-CSN element according to one embodiment of the present invention.

FIG. 12 shows an extended AP-CSN element according to one embodiment of the present invention. Referring to FIG. 12, an AP-CSN can have one of 0 to 65535 values. Each time an information element is updated, the AP-CSN can increase by 1 each based on modulo 65535. Thus, as a size of an AP-CSN field increases, a probability that a past AP-CSN value stored in an STA and a current AP-CSN value of an AP accidently match after update may be lowered.

Proposal 2

According to one embodiment of the present invention, a BSS configuration parameter set can be refreshed in an STA.

For example, an STA can retain a BSS configuration parameter set of a preferred AP during a specific time (e.g., several hours, several days) only. Hence, if a timer set for each BSS configuration parameter set expires, the STA can delete the corresponding BSS configuration parameter set.

Hence, when the STA attempts an access to the preferred AP, if a BSS configuration parameter set for the corresponding AP does not exist (i.e., the BSS configuration parameter set is deleted), the STA sends a probe request frame that does not include an AP-CSN. In response to the corresponding probe request frame, the AP sends a general probe response frame.

Regarding a time for the STA to retain the BSS configuration parameter set (e.g., BSS configuration parameter set retain timer), the AP directly determines a timer value and then informs the STA of the timer value. Or, the STA can calculate and set a timer value based on a parameter sent by the AP.

For example, the AP can inform the STA of a minimum time for retaining an AP-CSN value (e.g., minimum required AP-CSN retain time). In this case, the STA can calculate a time for retaining the BSS configuration parameter set based on the minimum required AP-CSN retain time.

For instance, a retain time of BSS configuration parameter set can be set to 'minimum required AP-CSN retain time*$2^{size\ (unit:\ bits)\ of\ AP\text{-}CSN}$'.

If a size of AP-CSN is 8 bits, a retain time of BSS configuration parameter set can be set to 'minimum required AP-CSN retain time*256'.

Such a minimum required AP-CSN retain time can be sent to STAs through one of portions of a MAC header of a management frame, a control frame) or a data frame of a beacon frame/probe response frame or the like.

The BSS configuration parameter retain time may be set to an initial value when a beacon frame or a probe response frame is received from the corresponding AP. For another example, only when a beacon frame including a changed AP-CSN is received from the corresponding AP, the BSS configuration parameter retain time may be set to an initial value.

Proposal 3

When an AP is restarted or reset, system information retained by the AP may be different from a BSS configuration parameter set of a preferred AP stored in an STA. For instance, after de-association of the STA, it may happen that the AP is restarted or rest. As described above, if a length of AP-CSN is 1 octet, the AP randomly selects an unsigned integer from a range of 0~255 and then sets it as an initial value of the AP-CSN. Or, like the proposal 1, if a length of the AP-CSN is N octets, a random unsigned integer in a range of 0 to $(2^N-1)$ can be selected as an initial value of the AP-CSN.

Thus, it may happen that a current AP-CSN value (e.g., an initial value of the after the restart/reset of the AP after restart/rest or an AP-CSN value updated after the initial value) and a past AP-CSN value stored in the STA accidently match after the restart/reset of the AP. Yet, a BSS configuration parameter set intended by a current AP-CSN of the AP may be different from a BSS configuration parameter set intended by a past AP-CSN of the STA.

In this case, if the STA sends a probe request frame in which an AP-CSN stored by the STA is contained, since the AP sends an information element, which will be contained in a probe response frame, on the basis of a current AP-CSN and past AP-CSN values of an AP-CSN list stored after the restart/reset, it causes a problem that the STA is unable to correctly obtain system information of the AP. Therefore, methods for solving such a problem are described in the proposal 3.

In order to solve such a problem, according to one embodiment of the present invention, an AP can retain a BSS restart/reset counter. The BSS restart/reset counter can indicate how many times the AP is restarted/reset. For instance, each time the AP is restarted/reset, the BSS restart/reset counter can be incremented by 1 each. For clarity of the following description, the corresponding information shall be named a BSS restart counter, by which the present invention is non-limited.

When an AP sends system information (e.g., beacon/probe response/association response frame), an AP may send a BSS restart counter to STAs together with the corresponding system information. The BSS restart counter may be sent to STAs through a portion of a MAC header of another management frame, action frame, control frame and/or data frame as well as the beacon/probe response/association response frame. Or, the BSS restart counter may be sent through a PLCP/PHY header (e.g., one of STF, LTF and SIG fields) as well.

Through the BSS restart counter, the STA can obtain whether system information (e.g., BSS configuration parameter set) stored for the corresponding AP/BSS is valid and/or whether the AP/BSS is restarted.

Moreover, when an active scanning is performed, the STA can send a probe request fame in which the BSS restart counter is contained together with an AP-CSN element. If receiving the probe request frame containing the BSS restart counter information, the AP compares the received BSS restart counter information with current BSS restart counter information of its own. If a value of the received BSS restart counter information is different from that of the current BSS restart counter information of its own, the AP regards that the STA has inaccurate system information and is able to send a general probe response frame instead of an optimized probe response frame.

If the value of the received BSS restart counter information and the value of the current BSS restart counter information of its own match, the AP confirms a received AP-CSN value and a current AP-CSN value of its own and is then able to determine whether to send an optimized probe response or a general probe response to the STA. For instance, a) If an AP-CSN value that matches a current AP-CSN value is received, the AP sends an optimized probe response frame including mandatory fields, which include a timestamp field, a capability field and a beacon interval field, a current AP-CSN element and a dynamic element. b) If an AP-CSN value matching a past AP-CSN value of the AP-CSN list of the PA is received, the AP sends an optimized probe response frame including mandatory fields, which include a timestamp field, a capability field and a beacon interval field, a current AP-CSN element, an information element for an update by an STA side and a dynamic element. c) If an AP-CSN value failing to match any AP-CSN value of the AP-CSN list of the AP, the AP sends a probe response frame including a current AP-CSN and fields of a general probe response frame.

Figure 13:
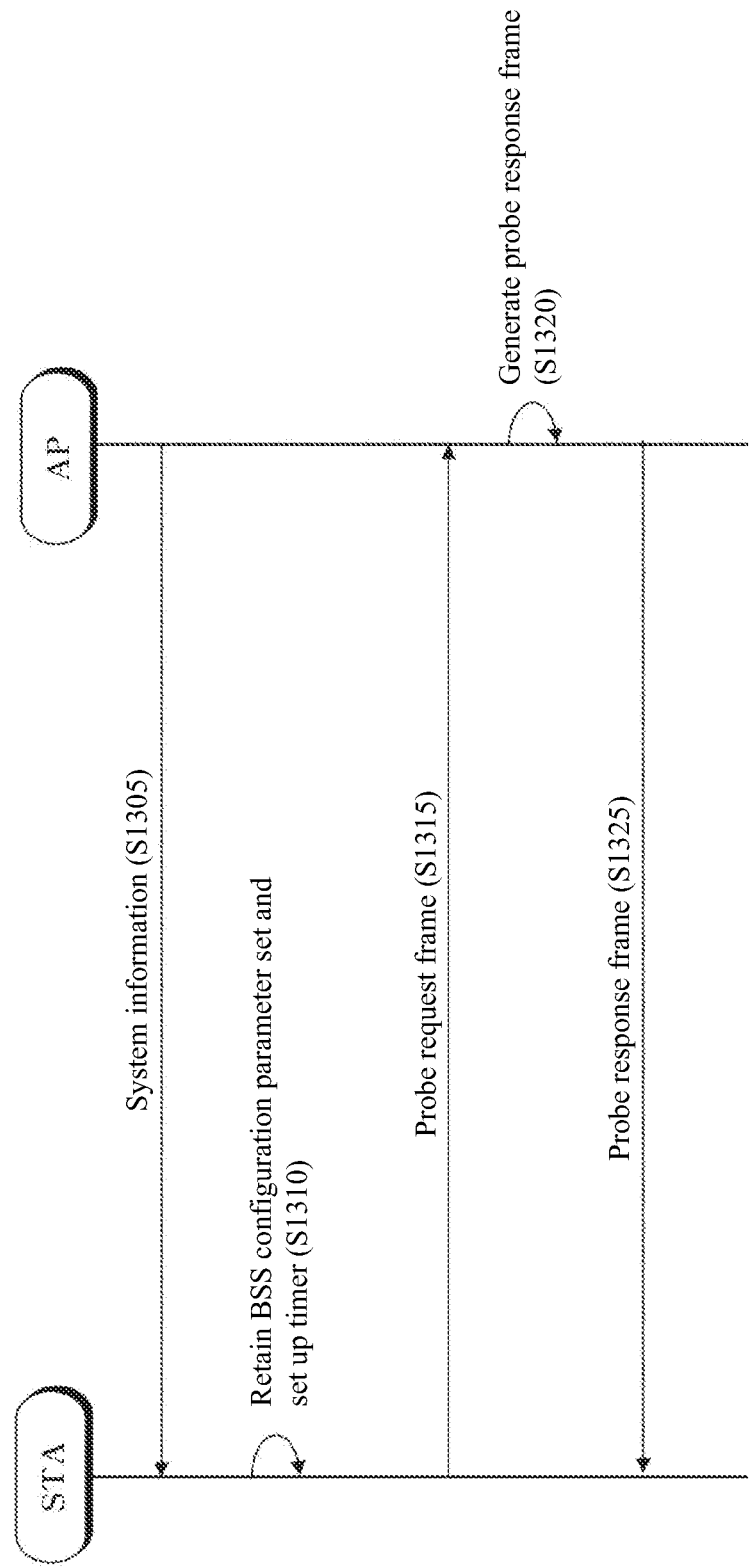
FIG. 13 shows a flow of an active scanning method according to one embodiment of the present invention.

FIG. 13 shows a flow of an active scanning method according to one embodiment of the present invention.

An STA obtains system information from a preferred AP accessed by the STA [S1305]. It is assumed that, the STA is de-associated from the preferred AP after obtaining the system information.

At least one portion of the system information may be included in a BSS configuration parameter set. The STA retains the stored BSS configuration parameter set based on the system information and sets a timer indicating a time for retaining the BSS configuration parameter set [S1310].

The STA sends a probe request frame if attempting a re-access to the preferred AP [S1315]. If attempting to access the AP before the timer expires, the STA sends a probe request frame including an AP-CSN (AP configuration sequence number) indicating a version of the BSS configuration parameter set to the AP. Otherwise, if it is the time after expiration of the timer, the STA sends a general probe request frame to the AP.

Meanwhile, based on a length of an AP-CSN, the STA can set a value of the timer for retaining the BSS configuration parameter set. For instance, the timer value may increase or decrease exponentially with respect to a length of AP-CSN. The timer value is set to $M*2^N$, 'M' may mean a minimum time for retaining AP-CSN, and 'N' may mean a length of the AP-CSN. The STA can receive a frame, which indicates the minimum time 'M' for retaining the AP-CSN, from the AP.

Moreover, the probe request fame may further include information of an AP's restart count known to the STA.

The AP creates a probe response frame [S1320] and sends it to the STA [S1325]. Contents of the probe response fame may be determined according to whether the AP's restart count included in the probe request frame and the AP-CSN matches up with the actual restart count of the AP and the current AP-CSN of the AP, respectively.

For instance, if the AP's restart count included in the probe request fame matches up with the actual restart count of the AP and the AP-CSN matches up with the current AP-CSN of the AP, the probe response frame may include a portion of the system information only.

Or, when the AP's restart count included in the probe request fame matches up with the actual restart count of the AP, but the AP-CSN does not match up with the current AP-CSN of the AP, the probe response frame may further include information the STA should update in addition to a portion of the system information.

If the AP's restart count included in the probe request fame does not match up with the actual restart count of the AP, the probe response frame may include the whole system information.

Figure 14:
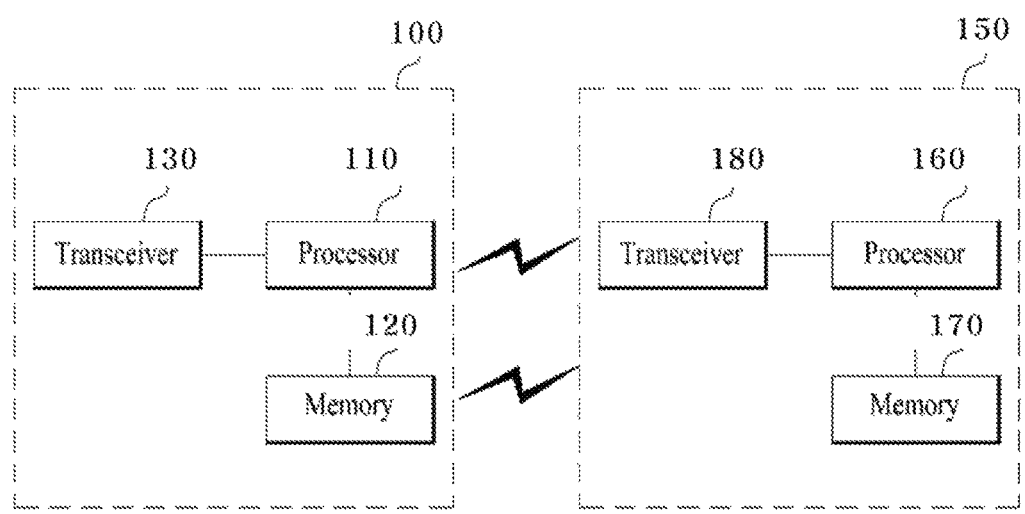
FIG. 14 illustrates an apparatus according to an embodiment of the present invention.

FIG. 14 is an explanatory diagram of apparatuses for implementing the aforementioned method.

A wireless device 800 and a wireless device 850 in FIG. 14 may correspond to the aforementioned STA/AP 1 and STA/AP 2, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention has been described on the assumption that the present invention is applied to a wireless LAN system supporting HE PPDUs. However, the present invention is not limited thereto and can be applied to various wireless communication systems including IEEE 802.11.

What is claimed is:

1. A method of performing active scanning by a station (STA) in a wireless local area network (LAN) system, comprising:
   setting a timer for retaining a basic service set (BSS) configuration parameter set which has been obtained in advance by the STA from an access point (AP); and
   transmitting, to the AP, a probe request frame including an AP configuration sequence number (AP-CSN) indicating a version of the BSS configuration parameter set, when the STA is attempting to access the AP before the timer expires,
   wherein the STA sets a value of the timer for retaining the BSS configuration parameter set based on a length of the AP-CSN.

2. The method of claim 1, wherein the value of the timer exponentially increases or decreases with respect to the length of the AP-CSN.

3. The method of claim 1, wherein the value of the timer is set to $M*2^N$, where 'M' denotes a minimum time for retaining the AP-CSN, and 'N' denotes the length of the AP-CSN.

4. The method of claim 3, further comprising:
receiving a frame indicating the minimum time 'M' for retaining the AP-CSN from the AP.

5. The method of claim 1, wherein the probe request frame further comprises information on an AP's restart count known to the STA.

6. The method of claim 5, further comprising:
receiving a probe response frame from the AP,
wherein contents of the probe response fame is determined according to whether the AP's restart count included in the probe request frame and the AP-CSN matches up with an actual restart count of the AP and a current AP-CSN of the AP, respectively.

7. The method of claim 6,
wherein when the AP's restart count included in the probe request fame matches up with the actual restart count of the AP and the AP-CSN matches up with the current AP-CSN of the AP, the probe response frame includes only a portion of system information,
wherein when the AP's restart count included in the probe request fame matches up with the actual restart count of the AP, but the AP-CSN does not match up with the current AP-CSN of the AP, the probe response frame further includes information the STA should update in addition to the portion of the system information, and
wherein when the AP's restart count included in the probe request fame does not match up with the actual restart count of the AP, the probe response frame includes all of the system information.

8. The station of claim 7, wherein the value of the timer is set to $M*2^N$, where 'M' denotes a minimum time for retaining the AP-CSN, and 'N' denotes the length of the AP-CSN.

9. The station of claim 8, further comprising:
a receiver to receive a frame indicating the minimum time 'M' for retaining the AP-CSN from the AP.

10. The station of claim 7, wherein the probe request frame further comprises information on an AP's restart count known to the STA.

11. The station of claim 10, further comprising:
a receiver to receive a probe response frame from the AP,
wherein contents of the probe response fame is determined according to whether the AP's restart count included in the probe request frame and the AP-CSN matches up with an actual restart count of the AP and a current AP-CSN of the AP, respectively.

12. The station of claim 11,
wherein when the AP's restart count included in the probe request fame matches up with the actual restart count of the AP and the AP-CSN matches up with the current AP-CSN of the AP, the probe response frame includes only a portion of system information,
wherein when the AP's restart count included in the probe request fame matches up with the actual restart count of the AP, but the AP-CSN does not match up with the current AP-CSN of the AP, the probe response frame further includes information the STA should update in addition to the portion of the system information, and
wherein when the AP's restart count included in the probe request fame does not match up with the actual restart count of the AP, the probe response frame includes all of the system information.

13. A station (STA) performing active scanning in a wireless local area network (LAN) system, comprising:
a transmitter to transmit a probe request frame to an access point (AP); and
a processor to set a timer for retaining a basic service set (BSS) configuration parameter set which has been obtained in advance by the STA from an access point (AP) and to set an AP configuration sequence number (AP-CSN) indicating a version of the BSS configuration parameter set to the probe request frame when the STA is attempting to access the AP before the timer expires,
wherein the processor is further configured to set a value of the timer for retaining the BSS configuration parameter set based on a length of the AP-CSN.

14. The station of claim 13, wherein the value of the timer exponentially increases or decreases with respect to the length of the AP-CSN.

* * * * *